United States Patent
Chen et al.

(10) Patent No.: US 12,265,466 B2
(45) Date of Patent: Apr. 1, 2025

(54) MULTI-DRIVERS-IN-THE-LOOP DRIVING TESTING PLATFORM

(71) Applicant: Jilin University, Jilin (CN)

(72) Inventors: Hong Chen, Jilin (CN); Shuo Cai, Jilin (CN); Haitao Ding, Jilin (CN); Yunfeng Hu, Jilin (CN); Xun Gong, Jilin (CN); Jiamei Lin, Jilin (CN); Qijun Chen, Jilin (CN); Zhuping Wang, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 0 days.

(21) Appl. No.: 17/778,897

(22) PCT Filed: May 13, 2021

(86) PCT No.: PCT/CN2021/093471
§ 371 (c)(1),
(2) Date: Nov. 17, 2022

(87) PCT Pub. No.: WO2022/236754
PCT Pub. Date: Nov. 17, 2022

(65) Prior Publication Data
US 2024/0104008 A1    Mar. 28, 2024

(51) Int. Cl.
*G06F 11/3668*    (2025.01)
*B60W 60/00*    (2020.01)

(52) U.S. Cl.
CPC ....... *G06F 11/3688* (2013.01); *B60W 60/005* (2020.02); *B60W 2710/20* (2013.01)

(58) Field of Classification Search
CPC ............. G06F 11/3688; B60W 60/005; B60W 2710/20
See application file for complete search history.

(56) References Cited

FOREIGN PATENT DOCUMENTS

| | | | |
|---|---|---|---|
| CN | 109765803 A | * | 5/2019 |
| CN | 111353221 A | * | 6/2020 .......... G01M 17/007 |

OTHER PUBLICATIONS

English Machine Translation of CN-109765803-A (Year: 2019).*
English Machine Translation of CN-111353221-A (Year: 2020).*

* cited by examiner

*Primary Examiner* — Andrew J Cromer
(74) *Attorney, Agent, or Firm* — Manelli Selter PLLC; Edward Stemberger

(57) ABSTRACT

A multi-drivers-in-the-loop driving testing platform is provided including at least a sensing simulation system, a vehicle dynamic simulation system, a driving simulator and a scene simulation system. The sensing simulation system is configured to generate object-level perception information, and send it to a vehicle control system; the driving simulator is configured to provide a driving environment and a driving scene for a human driver, output a driving instruction according to a driving intention of the human driver, and then send the driving instruction to the vehicle control system; the vehicle dynamic simulation system is configured to calculate state information according to control signals output by the vehicle control system; and the scene simulation system is configured to update the driving scene displayed in the driving simulator timely according to the vehicle state information. The disclosure saves costs of research and development and shortens cycles of research and development.

7 Claims, 2 Drawing Sheets

MULTI-DRIVERS-IN-THE-LOOP DRIVING TESTING PLATFORM

CROSS REFERENCE TO RELATED APPLICATION

The present application claims priority to International Application No. PCT/CN2021/093471 filed on May 13, 2021 and entitled "A MULTI-DRIVERS-IN-THE-LOOP DRIVING TESTING PLATFORM", which is incorporated herein by reference in its entirety.

TECHNICAL FIELD

The present disclosure relates to the technical field of development and testing of autonomous driving systems, and particularly relates to a multi-drivers-in-the-loop driving testing platform.

BACKGROUND ART

With the development of the autonomous driving technology, the testing and evaluation technology of autonomous vehicles has also become an important part of the development and testing of autonomous driving systems. According to the research by the RAND Corporation of the United States, autonomous vehicles would have to be driven hundreds of millions of miles and sometimes hundreds of billions of miles to demonstrate their reliability in terms of fatalities and injuries. Only traditional closed field tests and open road tests cannot complete such large test mileage requirements, and also consume unbearable economic cost and time cost.

It is an alternative for the development and testing of autonomous driving systems to develop an autonomous vehicle simulation platform for virtual simulation testing. However, relevant researches are lacking at present.

SUMMARY

Based on this, it is necessary to provide a multi-drivers-in-the-loop driving testing platform.

In order to achieve the above objective, the present disclosure provides the following technical solutions:

A multi-drivers-in-the-loop driving testing platform includes at least a sensing simulation system, a vehicle dynamic simulation system, a driving simulator and a scene simulation system, where:
the sensing simulation system is configured to generate object-level perception information, and send the object-level perception information to a vehicle control system;
the driving simulator is configured to provide a driving environment and a driving scene for a human driver, output a driving instruction according to a driving intention of the human driver, and then send the driving instruction to the vehicle control system;
the vehicle dynamic simulation system is configured to calculate vehicle state information such as vehicle position and attitude according to control signals output by the vehicle control system; and
the scene simulation system is configured to update the driving scene displayed in the driving simulator in real time according to the vehicle state information.

Optionally, the sensing simulation system includes a main vehicle sensing simulation subsystem and a plurality of traffic vehicle sensing simulation subsystems, and each of the main vehicle sensing simulation subsystem and the plurality of traffic vehicle sensing simulation subsystems includes a sensing generation host, an Ethernet, an Ethernet-to-controller area network (CAN) module and a CAN bus, where the sensing generation host and the Ethernet-to-CAN module are arranged in a cabinet;
the sensing generation host is configured to transmit the object-level perception information to the Ethernet-to-CAN module through the Ethernet with the Ethernet signal protocol; and
the Ethernet-to-CAN module is configured to convert the Ethernet signal into a vehicle-mounted CAN signal, and send the vehicle-mounted CAN signal to the vehicle control system through the CAN bus.

Optionally, the object-level perception information is traffic target information acquired by virtual sensors; the traffic target information includes traffic vehicle information, pedestrian information, lane line information and traffic light information; and the virtual sensors are respectively configured on a main vehicle and traffic vehicles, and the virtual sensors includes cameras and millimeter-wave radars.

Optionally, the driving simulator includes a main vehicle driving simulator and a plurality of traffic vehicle driving simulators, and each of the main vehicle driving simulator and the plurality of traffic vehicle driving simulators includes a driver's seat, a steering wheel, an accelerator pedal, a brake pedal, a steering motor and a steering controller; where:
driving modes of vehicle control system include an unmanned driving mode, a human-machine co-driving mode and a manual driving mode;
when the driving mode of the vehicle control system is the manual driving mode, the steering controller is configured to collect an accelerator pedal opening signal, a brake pedal opening signal and a steering wheel angle signal, and transmit the accelerator pedal opening signal, the brake pedal opening signal and the steering wheel angle signal to the vehicle control system through the CAN bus;
when the driving mode of the vehicle control system is the unmanned driving mode, the steering controller is configured to control the steering motor to work in a steering angle control mode; and
when the driving mode of the vehicle control system is the human-machine co-driving mode, the steering controller is configured to control the steering motor to work in a torque control mode.

Optionally, the main vehicle driving simulator is a double-seat driving simulator, and the traffic vehicle driving simulators are single-seat driving simulators.

Optionally, the vehicle control system is configured to load different autonomous driving algorithms according to different development and testing requirements; and the vehicle control system is configured to calculate the control signals according to the object-level perception information, the driving instruction and the autonomous driving algorithm.

Optionally, the vehicle dynamic system includes a main vehicle dynamic subsystem and a plurality of traffic vehicle dynamic subsystems, and each of the main vehicle dynamic subsystem and the plurality of traffic vehicle dynamic subsystems includes a vehicle dynamic host; the vehicle dynamic host is used to load different vehicle dynamic models according to different development requirements; the vehicle dynamic host is arranged in the cabinet; and
the vehicle dynamics host is also configured to simulate a vehicle motion process according to the vehicle dynamics model and the control signal, and calculate the vehicle position, attitude and other state information in real time.

Optionally, the scene simulation system includes a main vehicle scene simulation subsystem and a plurality of traffic vehicle scene simulation subsystems; where:

the main vehicle scene simulation subsystem includes a U-shaped projection screen, projectors, a main vehicle fusion machine and a main vehicle scene generation host, where the U-shaped projection screen and the projectors are arranged in a main vehicle cab; the main vehicle fusion machine and the main vehicle scene generation host are arranged in the cabinet; a main vehicle driving scene simulation model is deployed in the main vehicle scene generation host; the main vehicle scene generation host is configured to generate a driving scene of the main vehicle in real time according to the main vehicle driving scene simulation model and the vehicle state information of the main vehicle, and send the driving scene of the main vehicle to the fusion machine in real time; the fusion machine is configured to fuse the driving scene of the main vehicle in real time; and the projectors are configured to project the fusion driving scene of the main vehicle on the U-shaped projection screen; and the traffic vehicle scene simulation subsystem includes a triple-screen display and a traffic vehicle scene generation host, where the triple-screen display is arranged in a traffic vehicle cab; the traffic vehicle scene generation host is arranged in the cabinet; a traffic vehicle driving scene simulation model is deployed in the traffic vehicle scene generation host; and the traffic vehicle scene generation host is configured to generate a traffic vehicle driving scene in real time according to the traffic vehicle driving scene simulation model and the position and attitude information of the traffic vehicle, and send the traffic vehicle driving scene to the triple-screen display for display in real time.

Optionally, the U-shaped projection screen is a 270° U-shaped projection screen.

Optionally, both the main vehicle driving scene simulation model and the traffic vehicle driving scene simulation model are constructed including static environment elements, dynamic traffic elements and meteorological environment elements.

Compared with the conventional art, the present disclosure has the following beneficial effects:

The present disclosure provides a multi-drivers-in-the-loop driving testing platform, including at least the sensing simulation system, the vehicle dynamic simulation system, the driving simulator and the scene simulation system. The present disclosure adopts the virtual simulation technology and the driving simulator technology to overcome the defects of perfecting the automatic driving algorithm relying on traditional closed field test and traditional open road test, which ensures the safety of the human drivers. Therefore, the present disclosure has the advantages of saving costs and shortening cycles of research and development of the autonomous vehicle.

BRIEF DESCRIPTION OF THE DRAWINGS

In order to illustrate the technical solutions of the present disclosure more clearly, the accompanying drawings are briefly introduced below. Apparently, the accompanying drawings in the following descriptions show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a multi-drivers-in-the-loop driving testing platform which is used for developing and testing the autonomous driving algorithm, such that the non-reproducibility of the closed field test and the open road test can be solved, thereby ensuring the safety of testers, saving the research and development costs, shortening the research and development cycles, and accelerating the commercialization process of the autonomous driving technology.

To make the above objectives, features, and advantages of the present disclosure clearer and more comprehensible, the present disclosure will be further described in detail below in conjunction with the accompanying drawings and specific embodiments.

Embodiment 1

Figure 1:
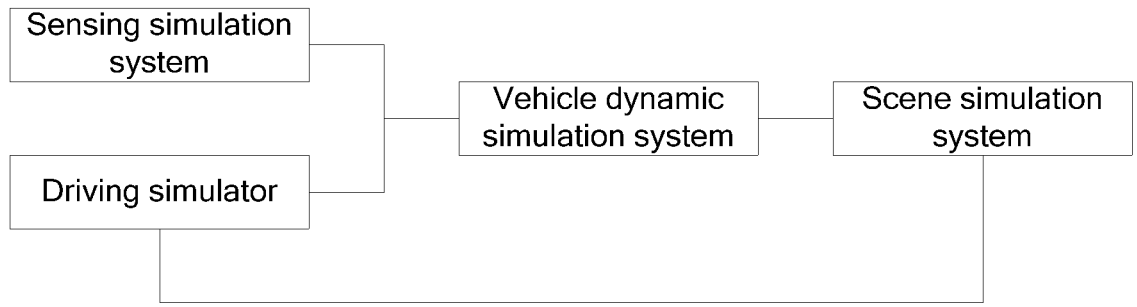
FIG. 1 is a structural block diagram of the multi-drivers-in-the-loop driving testing platform in the present disclosure.

An embodiment of the present disclosure provides a multi-drivers-in-the-loop driving testing platform, which is applied to the technical field of development and testing of autonomous driving systems. As shown in FIG. 1, the multi-drivers-in-the-loop driving testing platform includes at least a sensing simulation system, a vehicle dynamic simulation system, a driving simulator and a scene simulation system.

The sensing simulation system is configured to generate object-level perception information, and send the object-level perception information to a vehicle control system; the driving simulator is configured to provide a driving environment and a driving scene for a human driver, output a driving instruction according to a driving intention of the human driver, and then send the driving instruction to the vehicle control system; the vehicle dynamic simulation system is configured to simulate a vehicle moving process according to a control signal output by the vehicle control system, and calculate vehicle state information such as vehicle position and attitude; and the scene simulation system is configured to update the driving scene displayed in the driving simulator in real time according to the vehicle state information.

Each of the systems is described in detail below.

The sensing simulation system includes a main vehicle sensing simulation subsystem and a plurality of traffic vehicle sensing simulation subsystems, and each of the main vehicle sensing simulation subsystem and the plurality of traffic vehicle sensing simulation subsystems includes a sensing generation host, an Ethernet, an Ethernet-to-controller area network (CAN) module and a CAN bus, where the sensing generation host and the Ethernet-to-CAN module are arranged in a cabinet. At the same time, it should be noted that the main vehicle sensing simulation subsystem and the plurality of traffic vehicle sensing simulation subsystems may share one sensing generation host.

The sensing generation host is configured to transmit the object-level perception information to the Ethernet-to-CAN module through the Ethernet with the Ethernet signal protocol; and the Ethernet-to-CAN module is configured to convert the Ethernet signal into a standard vehicle-mounted CAN signal, and send the vehicle-mounted CAN signal to the vehicle control system for use through the CAN bus.

The object-level perception information refers to traffic target information detected by virtual sensors such as cameras and millimeter-wave radars. The traffic target information includes traffic vehicle information (speed, pose, acceleration, etc.), pedestrian information (speed, pose, acceleration, etc.), lane line information (type, color, curvature, lane line cubic polynomial fitting parameters), and traffic light information (location and color of the traffic light). The virtual sensors are respectively configured on a main vehicle and traffic vehicles.

The driving simulator includes a main vehicle driving simulator and a plurality of traffic vehicle driving simulators. The human drivers can control the traffic vehicle through the driving simulators to provide complex driving scenes for the main vehicle, thereby developing and testing the autonomous driving algorithm of the main vehicle. This embodiment achieves the technical effect that multiple human drivers drive vehicles in the same driving scene by arranging one main vehicle driving simulator and the plurality of traffic vehicle driving simulators.

The main vehicle driving simulator is a double-seat driving simulator, the traffic vehicle driving simulator is a single-seat driving simulator, and each of the main vehicle driving simulator and the traffic vehicle driving simulators includes a driver's seat, a steering wheel, an accelerator pedal, a brake pedal, a steering motor and a steering controller, where the steering motor has a steering angle control mode and a torque control mode.

Driving modes loaded by the vehicle control system include an unmanned driving mode, a human-machine co-driving mode and a manual driving mode.

When the driving mode of the vehicle control system is the manual driving mode, the steering controller is configured to collect an accelerator pedal opening signal, a brake pedal opening signal and a steering wheel angle signal, and then transmit the accelerator pedal opening signal, the brake pedal opening signal and the steering wheel angle signal to the vehicle control system through the CAN bus to control the vehicle.

When the driving mode of the vehicle control system is the unmanned driving mode, the steering controller is configured to control the steering motor to work in the steering angle control mode.

When the driving mode of the vehicle control system is the human-machine co-driving mode, the steering controller is configured to control the steering motor to work in the torque control mode.

Steering angle control mode: a closed-loop control is performed with a steering angle as a control objective, an instruction sent to the steering controller is a steering angle instruction, and the steering motor always follows a set steering angle. The steering angle control mode can be used in an unmanned driving mode to turn the steering wheel, instead of the human driver, thereby control the steering of the vehicle.

Torque control mode: the closed-loop control is performed with an output torque of the motor as a control objective, an instruction sent to the steering controller is a torque instruction, the steering motor always follows a set torque, and the steering angle of the steering wheel is related to a load of the steering wheel. The torque control mode can be used in the human-machine co-driving mode. During the driving process of the human driver, the vehicle control system can intervene to correct the steering operation of the human driver, and thus a human-machine co-driving algorithm can be developed and tested, and at the same time, the human-machine co-driving algorithm can also run in the steering controller.

It should be noted that the human-machine co-driving algorithm here has no specific content, but just wants to explain the functions of the multi-drivers-in-the-loop driving testing platform, which can not only support the development and testing of autonomous driving algorithms, but also support the development and testing of human-machine co-driving algorithms.

The vehicle control system is configured to load different autonomous driving algorithms according to different development and testing requirements. The vehicle control system is also configured to calculate the control signals according to the object-level perception information, the driving instruction and the autonomous driving algorithm. Since the main vehicle and the traffic vehicles are respectively provided with vehicle control systems, control signals include main vehicle control signals and traffic vehicle control signals.

The vehicle dynamic system includes a main vehicle dynamic subsystem and a plurality of traffic vehicle dynamic subsystems. Each of the main vehicle dynamic subsystem and the plurality of traffic vehicle dynamic subsystems includes a vehicle dynamic host, and the vehicle dynamic host is arranged in the cabinet.

The vehicle dynamic host is configured to deploy different vehicle dynamic models according to different development requirements. That is, the vehicle dynamic model can be customized to meet the development and testing requirements of different autonomous driving algorithms. The vehicle dynamic host is also configured to simulate a vehicle moving process according to the vehicle dynamic model and the control signal, and calculate the vehicle state information in real time. The vehicle state information includes main vehicle state information and traffic vehicle state information. The main vehicle dynamic subsystem and the traffic vehicle dynamic subsystems may share one vehicle dynamic host; and when the main vehicle dynamic subsystem and the traffic vehicle dynamic subsystems share one vehicle dynamic host, both a main vehicle dynamic model and traffic vehicle dynamic models are deployed in the vehicle dynamic host.

The vehicle dynamic host is an industrial control computer. The vehicle dynamic model is configured to simulate the dynamic change process of real vehicles (main vehicle and traffic vehicles) during driving. The vehicle dynamic model is built in commercial vehicle dynamics software (such as CarSim or CarRealTime), and the vehicle dynamic model can also be designed independently by programming software (such as matlab or Visual Studio). The vehicle dynamic model is downloaded into the industrial control computer to ensure the real-time operation.

The scene simulation system provides a realistic driving scene for the human driver. The scene simulation system includes a main vehicle scene simulation subsystem and a plurality of traffic vehicle scene simulation subsystems.

The main vehicle scene simulation subsystem includes a U-shaped projection screen, projectors, a main vehicle fusion machine and a main vehicle scene generation host, where the U-shaped projection screen and the projector are arranged in a main vehicle cab; the main vehicle fusion machine and the main vehicle scene generation host are arranged in the cabinet; a main vehicle driving scene simulation model is deployed in the main vehicle scene generation host; the main vehicle scene generation host is configured to generate a driving scene of the main vehicle in real time according to the main vehicle driving scene simulation model and the vehicle state information of the driving scene of the main vehicle in real time according to the main vehicle driving scene simulation model and the main vehicle pose information, and send the driving scene of the main vehicle to the main vehicle fusion machine in real time; and the main vehicle fusion machine is configured to fuse the driving scene of the main vehicle in real time, and the projectors are configured to project the fusion driving scene of the main vehicle on the U-shaped projection screen, thereby providing the realistic driving scene for the human driver of the main vehicle.

The U-shaped projection screen is a 270° U-shaped projection screen which provides a wider driving field of vision for the human driver of the main vehicle, so that the human driver of the main vehicle has a stronger sense of immersion. The human driver drives the main vehicle through the main vehicle driving simulator forming a driving scene that is closer to a real traffic flow.

The traffic vehicle scene simulation subsystem includes a triple-screen display and a traffic vehicle scene generation host, where the triple-screen display is arranged in a traffic vehicle cab; the traffic vehicle scene generation host is arranged in the cabinet; a traffic vehicle driving scene simulation model is deployed in the traffic vehicle scene generation host; and the traffic vehicle scene generation host is configured to generate a traffic vehicle driving scene in real time according to the traffic vehicle driving scene simulation model and the vehicle state information of the traffic vehicle, and send the traffic vehicle driving scene to the triple-screen display for display in real time, so as to provide a realistic driving scene for the human driver of the traffic vehicle. The human driver can drive the traffic vehicle to interact with the main vehicle in real time through the traffic vehicle driving scene.

Both the main vehicle driving scene simulation model and the traffic vehicle driving scene simulation model are configured to simulate the driving scenes of vehicles during driving.

Both the main vehicle driving scene simulation model and the traffic vehicle driving scene simulation model are constructed including static environment elements (such as roads, traffic facilities, static obstacles, etc.), dynamic traffic elements (such as traffic vehicles, pedestrians, animals, etc.) and meteorological environment elements (such as light, rain, snow, fog, etc.). When the vehicle is running, the elements in the simulation model of the driving scene of the main vehicle and the simulation model of the driving scene of the traffic vehicle are updated to update the driving scene of the vehicle.

Figure 2:
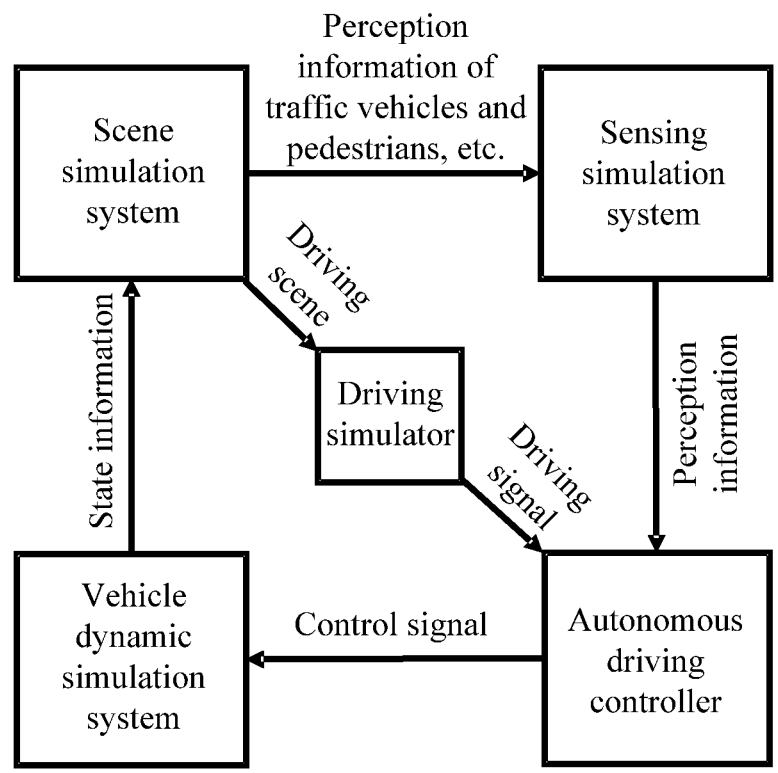
FIG. 2 is a connection relationship diagram of the four systems in the multi-drivers-in-the-loop driving testing platform in the present disclosure.

The relationship among the sensing simulation system, the vehicle dynamic simulation system, the driving simulator and the scene simulation system is shown in FIG. 2.

The scene simulation system is configured to simulate and generate a driving scene according to the static environment elements, the dynamic traffic elements and the meteorological environment elements, and display the driving scene in real time in the form of video; the human driver observes the real-time driving scene and manipulates the steering wheel, the accelerator pedal and the brake pedal in the driving simulator according to his own driving intention; the sensing simulation system simulates virtual sensors such as cameras and millimeter-wave radars, and sends the information of traffic vehicles, pedestrians, roads and traffic lights detected by the virtual sensors to an autonomous driving controller; the autonomous driving controller receives driving signals (steering wheel signal, accelerator pedal signal and brake pedal signal) from the driving simulator and sensing signals from the sensing simulation system, performs planning, decision making and control according to an autonomous driving algorithm, and sends the control signals to the vehicle dynamic simulation system; the vehicle dynamic simulation system simulates a real vehicle moving process, in which, after receiving the control signals, the vehicle dynamic simulation system calculates a change of the state of the vehicle by the vehicle dynamic model, and transmits the vehicle state information to the scene simulation system in real time; and the scene simulation system updates the driving scene in real time according to the change of the state of the vehicle, thereby forming a driving closed loop.

Embodiment 2

Figure 3:
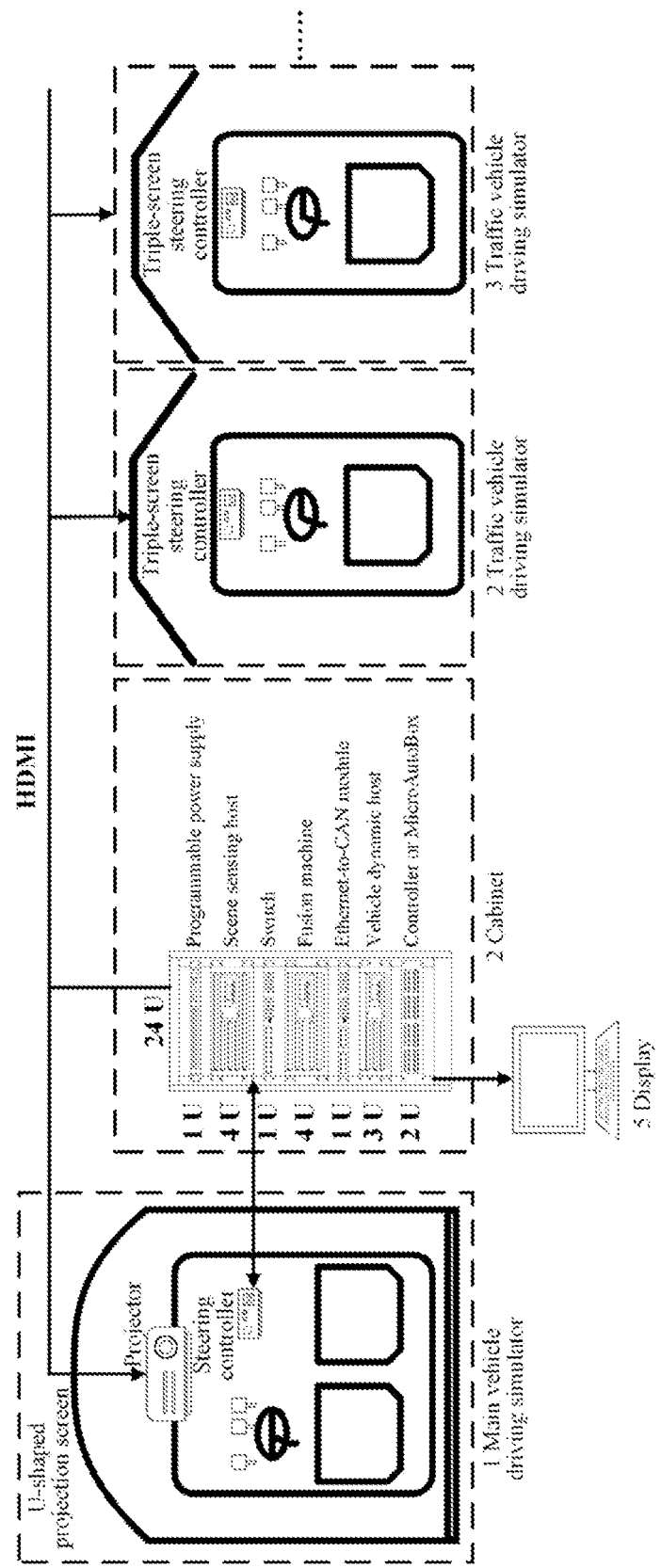
FIG. 3 is a schematic structural diagram of a device structure of the multi-drivers-in-the-loop driving testing platform in the present disclosure.

An embodiment of the present disclosure further provides a device using the multi-drivers-in-the-loop driving testing platform described in the Embodiment 1. As shown in FIG. 3, the device provided in this embodiment includes a double-seat main vehicle driving simulator 1, a first single-seat traffic vehicle driving simulator 2, a second single-seat traffic vehicle driving simulator 3, a cabinet 4 and a display 5.

The double-seat main vehicle driving simulator 1 provides a driving environment and a driving scene for a human driver of a main vehicle. The double-seat main vehicle driving simulator includes one 270° U-shaped projection screen, projectors, two seats, one accelerator pedal, one brake pedal, one steering controller, one steering motor and one double-seat frame made of aluminum profiles.

The first single-seat traffic vehicle driving simulator 2 and the second single-seat traffic vehicle driving simulator 3 provide a driving environment and a driving scene for a human driver of a traffic vehicle. Each of the first single-seat traffic vehicle driving simulator 2 and the second single-seat traffic vehicle driving simulator 3 includes three displays, one driving seat, one accelerator pedal, one brake pedal, one steering controller, one steering motor and one single-seat frame made of aluminum profiles.

The cabinet 4 is configured to fixedly install the devices required by the multi-drivers-in-the-loop driving testing platform. The cabinet 4 is installed with one programmable power supply, one scene-sensing host, one ethernet switch, one fusion machine, one Ethernet-to-CAN module, one vehicle dynamic host and one controller (or MicroAutobox), where the scene-sensing host is used as both a scene generation host and a sensing generation host.

The display 5 is configured to display a control interface of the scene-sensing host.

Commercial traffic simulation software is installed in the scene-sensing host for simulating the entire driving scene; virtual sensors (cameras and millimeter-wave radars) can be configured in vehicles, and then, the virtual sensors can detect traffic targets; the traffic targets information can be read and sent to the Ethernet through the program written with the application programming interface.

Compared with the conventional art, the present disclosure has the following advantages:
(1) The multi-drivers-in-the-loop driving testing platform can create more complex driving scenes for the main vehicle.
(2) Most of the traffic vehicles in existing autonomous driving simulation platforms are program-controlled, but the multi-drivers-in-the-loop driving testing platform provided in the present disclosure is controlled by the human driver using driving simulators, which is closer to real road test conditions.
(3) The multi-drivers-in-the-loop driving testing platform provided in the present disclosure can support the human-machine co-driving algorithm or the autonomous driving algorithm to run in industrial control computer, MicroAutobox or controller, so as to meet the requirements of software-in-the-loop testing and hardware-in-the-loop testing in algorithm development and testing processes, so that the algorithm can be rapidly iterated to accelerate the algorithm development process of autonomous driving vehicles.
(4) The multi-drivers-in-the-loop driving testing platform provided in the present disclosure can save costs of research and development and shorten cycles of research and development, thereby accelerating the commercialization process of the autonomous driving technology.

Each embodiment of the present specification is described in a progressive manner, each embodiment focuses on the difference from other embodiments, and the same and similar parts between the embodiments may refer to each other.

In this specification, some specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of the present description shall not be construed as limitations to the present disclosure.

What is claimed is:

1. A multi-drivers-in-the-loop driving testing platform, comprising at least a sensing simulation system, a vehicle dynamic simulation system, a driving simulator and a scene simulation system, wherein
the sensing simulation system is configured to generate object-level perception information, and send the object-level perception information to a vehicle control system;
the driving simulator is configured to provide a driving environment and a driving scene for a human driver, output a driving instruction according to a driving intention of the human driver, and then send the driving instruction to the vehicle control system;
the vehicle dynamic simulation system is configured to calculate vehicle state information including vehicle position and attitude according to control signals output by the vehicle control system; and
the scene simulation system is configured to update the driving scene displayed in the driving simulator in real time according to the vehicle state information;
wherein the sensing simulation system comprises a main vehicle sensing simulation subsystem and a plurality of traffic vehicle sensing simulation subsystems, and each of the main vehicle sensing simulation subsystem and the plurality of traffic vehicle sensing simulation subsystems comprises a sensing generation host, an Ethernet, an Ethernet-to-controller area network (CAN) module and a CAN bus;
wherein the vehicle dynamic system comprises a main vehicle dynamic subsystem and a plurality of traffic vehicle dynamic subsystems, and each of the main vehicle dynamic subsystem and the plurality of traffic vehicle dynamic subsystems comprises a vehicle dynamic host;
wherein the scene simulation system comprises a main vehicle scene simulation subsystem and a plurality of traffic vehicle scene simulation subsystems;
wherein the main vehicle scene simulation subsystem comprises a U-shaped projection screen, projectors, a main vehicle fusion machine and a main vehicle scene generation host, wherein the U-shaped projection screen and the projectors are arranged in a main vehicle cab; the main vehicle fusion machine and the main vehicle scene generation host are arranged in a cabinet; a main vehicle driving scene simulation model is deployed in the main vehicle scene generation host; the main vehicle scene generation host is configured to generate a driving scene of the main vehicle in real time according to the main vehicle driving scene simulation model and the vehicle state information of the main vehicle, and send the driving scene of the main vehicle to the main vehicle fusion machine in real time; the main vehicle fusion machine is configured to fuse the driving scene of the main vehicle in real time; the projectors are configured to project the fusion driving scene of the main vehicle on the U-shaped projection screen; and
the traffic vehicle scene simulation subsystem comprises a triple-screen display and a traffic vehicle scene generation host, wherein the triple-screen display is arranged in a traffic vehicle cab; the traffic vehicle scene generation host is arranged in the cabinet; a traffic vehicle driving scene simulation model is deployed in the traffic vehicle scene generation host; and the traffic vehicle scene generation host is configured to generate a traffic vehicle driving scene in real time according to the traffic vehicle driving scene simulation model and the vehicle state information of the traffic vehicle, and send the traffic vehicle driving scene to the triple-screen display for display in real time;
wherein the U-shaped projection screen is a 270° U-shaped projection screen;
wherein the vehicle control system comprises an autonomous driving controller;
wherein the driving simulator comprises a main vehicle driving simulator and a plurality of traffic vehicle driving simulators, and each of the main vehicle driving simulator and the plurality of traffic vehicle driving simulators comprises a driver's seat, a steering wheel, an accelerator pedal, a brake pedal, a steering motor and a steering controller; wherein driving modes loaded by the vehicle control system comprise an unmanned driving mode, a human-machine co-driving mode and a manual driving mode;

when the driving mode of the vehicle control system is the manual driving mode, the steering controller is configured to collect an accelerator pedal opening signal, a brake pedal opening signal and a steering wheel angle signal, and transmit the accelerator pedal opening signal, the brake pedal opening signal and the steering wheel angle signal to the vehicle control system through the CAN bus;

when the driving mode of the vehicle control system is the unmanned driving mode, the steering controller is further configured to control the steering motor to work in a steering angle control mode; and when the driving mode of the vehicle control system is the human-machine co-driving mode, the steering controller is further configured to control the steering motor to work in a torque control mode.

2. The multi-drivers-in-the-loop driving testing platform according to claim 1, wherein the sensing generation host and the Ethernet-to-CAN module are arranged in a cabinet;

the sensing generation host is configured to transmit the object-level perception information to the Ethernet-to-CAN module through the Ethernet with an Ethernet signal protocol; and the Ethernet-to-CAN module is configured to convert the Ethernet signal into a vehicle-mounted CAN signal, and send the vehicle-mounted CAN signal to the vehicle control system through the CAN bus.

3. The multi-drivers-in-the-loop driving testing platform according to claim 1, wherein the object-level perception information is traffic target information acquired by virtual sensors; the traffic target information comprises traffic vehicle information, pedestrian information, lane line information and traffic light information; and the virtual sensors are respectively arranged on a main vehicle and traffic vehicles, and the virtual sensors comprises cameras and millimeter-wave radars.

4. The multi-drivers-in-the-loop driving testing platform according to claim 1, wherein the main vehicle driving simulator is a double-seat driving simulator, and the traffic vehicle driving simulators are single-seat driving simulators.

5. The multi-drivers-in-the-loop driving testing platform according to claim 1, wherein the vehicle control system is configured to load different autonomous driving algorithms according to different development and testing requirements; and the vehicle control system is further configured to calculate the control signals according to the object-level perception information, the driving instruction and the autonomous driving algorithm.

6. The multi-drivers-in-the-loop driving testing platform according to claim 1, wherein the vehicle dynamic host is configured to load different vehicle dynamic models according to different development requirements; the vehicle dynamic host is arranged in a cabinet; and the vehicle dynamic host is further configured to simulate a vehicle moving process according to the vehicle dynamic model and the control signals, and calculate the vehicle state information in real time.

7. The multi-drivers-in-the-loop driving testing platform according to claim 1, wherein both the main vehicle driving scene simulation model and the traffic vehicle driving scene simulation models are constructed including static environment elements, dynamic traffic elements and meteorological environment elements.

* * * * *